UNITED STATES PATENT OFFICE.

CHARLES H. FRINGS, OF PHILADELPHIA, PENNSYLVANIA, ASSIGNOR TO THE NEW ERA BREWING COMPANY, OF MILWAUKEE, WISCONSIN.

PROCESS OF MANUFACTURING CARBONATED MALT BEVERAGES.

SPECIFICATION forming part of Letters Patent No. 316,451, dated April 28, 1885.

Application filed March 6, 1884. (No specimens.)

*To all whom it may concern:*

Be it known that I, CHARLES H. FRINGS, a citizen of the United States, residing at Philadelphia, in the county of Philadelphia and State of Pennsylvania, have invented a new and useful Improvement in Process of Manufacturing Carbonated Malted Beverages; and I hereby declare the following to be a full, clear, and exact description of the same.

My invention relates to that class of carbonated beverages which it is intended to use as non-alcoholic substitutes for fermented malt liquors, and especially to that beverage described in United States Letters Patent No. 264,941, granted to me September 26, 1882.

These unfermented beverages consist of an extract of cereals malted, or acted upon by malt, an extract of hops or other aromatic or bitter tonic, and carbonic acid. They possess, therefore, all valuable properties of malt liquors without the intoxicating principle; but they are deficient in lactic acid, of which they contain that small portion only which is always present in unfermented beer-worts or cereal extracts, whereas in malt liquors, during the process of alcoholic fermentation, as a secondary product thereof, a considerable portion of lactic acid is formed, the amount of which varies greatly with the kind of fermentation employed. Thus "lager-beer" shows of this pungent acid from one to two tenths of one per cent., ale and porter about three-tenths of one per cent., and "weiss-beer" even more.

As the character and pungent taste of a malted beverage is decidedly influenced by the presence of more or less lactic acid, it is the object of my invention to improve the said unfermented malted beverages to be used as non-alcoholic substitutes for malt liquors by supplying them extraneously with so much of lactic acid as is necessary to imitate a certain kind of malt liquor. This may be done at any stage in the manufacture of such carbonated beverages by adding to them a more or less concentrated solution of lactic acid or any suitable non-alcoholic compound containing lactic acid in a free state, the necessary amount of which solution or compound has been previously fixed. For the latter purpose any of the different methods usually employed in determining the strength of vinegar may be used in the following way: The acidity of the unfermented liquid to be supplied, and the fermented malt liquor to be imitated, and, furthermore, the strength of the given solution or compound of lactic acid to be added, must be ascertained by one and the same method. As one barrel (thirty-one gallons) of beer or other malted beverage weighs about four thousand two hundred ounces avoirdupois, one-tenth of one per cent. of acid will represent 4.2 ounces per barrel: and if, for instance, the strength of the unfermented liquid be 0.05 per cent., and the desired strength 0.20 per cent., the deficiency would amount to 0.15 per cent., or to 6.3 ounces per barrel. Thus, if the lactic-acid solution or compound on hand would show twenty per cent. of acid, then 31.5 ounces (by weight) are required to impart to the unfermented malted liquid the desired acidity.

In following this method no consideration is given to the usual presence of small portions of other acids than lactic acid in malt liquors or other malted beverages, and of lactates or other salts which may be present in the solutions or compounds of lactic acid employed; but this is practically of no importance, for the total amount of free acid only has to be determined successfully to carry out my invention.

What I claim as new, and desire to secure by Letters Patent, is—

In the manufacture of carbonated malted beverages to be used as non-alcoholic substitutes for malt liquors, the process of imparting to such carbonated malted beverage the pungent acidity of malt liquors, which consists in adding lactic acid from an extraneous source to the carbonated malted beverage, substantially as described.

CHARLES H. FRINGS.

In presence of—
J. BERNARD BRINTON,
JAMES M. ROBERTS.